United States Patent
Cao et al.

(10) Patent No.: US 12,147,729 B2
(45) Date of Patent: Nov. 19, 2024

(54) METHOD AND SYSTEM FOR PLAYING AUDIOS

(71) Applicant: TENCENT MUSIC ENTERTAINMENT TECHNOLOGY (SHENZHEN) CO., LTD., Shenzhen (CN)

(72) Inventors: Xiang Cao, Shenzhen (CN); Ge Tang, Shenzhen (CN); Haojie Xu, Shenzhen (CN); Zhengtao Wang, Shenzhen (CN); Zhaoheng Lei, Shenzhen (CN)

(73) Assignee: TENCENT MUSIC ENTERTAINMENT TECHNOLOGY (SHENZHEN) CO., LTD., Shenzhen (CN)

( * ) Notice: Subject to any disclaimer, the term of this patent is extended or adjusted under 35 U.S.C. 154(b) by 313 days.

(21) Appl. No.: 17/860,425

(22) Filed: Jul. 8, 2022

(65) Prior Publication Data
US 2022/0342631 A1    Oct. 27, 2022

Related U.S. Application Data

(63) Continuation of application No. PCT/CN2020/138910, filed on Dec. 24, 2020.

(30) Foreign Application Priority Data

Jan. 10, 2020    (CN) .......................... 202010028354.2

(51) Int. Cl.
*H04R 27/00*    (2006.01)
*G06F 3/16*    (2006.01)
(Continued)

(52) U.S. Cl.
CPC ........... *G06F 3/165* (2013.01); *G10H 1/0008* (2013.01); *G10L 19/00* (2013.01); *H04R 3/00* (2013.01);
(Continued)

(58) Field of Classification Search
CPC ................. G06F 3/165; G10H 1/0008; G10H 2210/056; G10H 2210/076; G10L 19/00; H04R 3/00
(Continued)

(56) References Cited

U.S. PATENT DOCUMENTS

2005/0222845 A1    10/2005    Nakagawa et al.
2007/0242040 A1    10/2007    Ullrich et al.
(Continued)

FOREIGN PATENT DOCUMENTS

CA    2705418 A1    11/2010
CN    102736732 A    10/2012
(Continued)

OTHER PUBLICATIONS

International Search Report of the International Searching Authority for State Intellectual Property Office of the People's Republic of China in PCT application No. PCT/CN2020/138910 issued on Mar. 22, 2021, which is an international application to which this application claims priority.

(Continued)

*Primary Examiner* — William J Deane, Jr.
(74) *Attorney, Agent, or Firm* — Kolitch Romano Dascenzo Gates LLC

(57) ABSTRACT

Provided a method for playing audios. The method includes: acquiring vibration control information corresponding to a target audio, wherein at least one vibration period and vibration attribute information corresponding to the at least one vibration period are recorded in the vibration control information, and each vibration period corresponds to a beat period of a target percussive instrument in the target audio; synchronously playing the target audio and the vibration control information; and when any vibration period of the at
(Continued)

least one vibration period is played, controlling a terminal to vibrate based on vibration attribute information corresponding to the vibration period.

20 Claims, 8 Drawing Sheets

(51) Int. Cl.
 *G10H 1/00* (2006.01)
 *G10L 19/00* (2013.01)
 *H04R 3/00* (2006.01)
(52) U.S. Cl.
 CPC . *G10H 2210/056* (2013.01); *G10H 2210/076* (2013.01)
(58) Field of Classification Search
 USPC .............................................. 381/56, 57, 58
 See application file for complete search history.

(56) References Cited

U.S. PATENT DOCUMENTS

| | | | |
|---|---|---|---|
| 2010/0207746 A1* | 8/2010 | Song | G06F 3/03543 345/163 |
| 2011/0128134 A1* | 6/2011 | Lee | G08B 6/00 340/407.2 |
| 2012/0216666 A1 | 8/2012 | Fresolone | |
| 2019/0220095 A1* | 7/2019 | Ogita | G06F 3/0346 |
| 2023/0338227 A1* | 10/2023 | Mortaza | A61H 23/0263 |
| 2024/0050689 A1* | 2/2024 | English | A61M 21/00 |
| 2024/0185694 A1* | 6/2024 | Zhu | H02P 25/034 |

FOREIGN PATENT DOCUMENTS

| | | |
|---|---|---|
| CN | 104506114 A | 4/2015 |
| CN | 105448311 A | 3/2016 |
| CN | 105898506 A | 8/2016 |
| CN | 105976852 A | 9/2016 |
| CN | 106713668 A | 5/2017 |
| CN | 107948874 A | 4/2018 |
| CN | 109599133 A | 4/2019 |
| CN | 111261185 A | 6/2020 |
| CN | 114945892 A | 8/2022 |

OTHER PUBLICATIONS

The State Intellectual Property Office of People's Republic of China, First Office Action in Patent Application No. 202010028354.2 issued on Feb. 14, 2023, which is a foreign counterpart application corresponding to this U.S. Patent Application, to which this application claims priority.

China National Intellectual Property Administration, Decision of Rejection of Chinese application No. 202010028354.2 issued on Sep. 20, 2023, which is foreign counterpart application of this US application.

* cited by examiner

METHOD AND SYSTEM FOR PLAYING AUDIOS

CROSS-REFERENCE TO RELATED APPLICATION

The present disclosure is a continuation application of International Application No. PCT/CN2020/138910, filed on Dec. 24, 2020, which claims the priority of Chinese Application No. 202010028354.2, filed on Jan. 10, 2020, both of which are incorporated by reference herein.

TECHNICAL FIELD

The present disclosure relates to the field of internet technologies, and in particular to a method and system for playing audios.

BACKGROUND

In the related art, a user can download music audios to his/her mobile phone through a network by operating the mobile phone. Then, the user can only play the downloaded audios through a built-in speaker or an externally connected earphone of the mobile phone. The manner of presenting audios is monotonous and inflexible.

SUMMARY

Embodiments of the present disclosure provide a method and system for playing audios, which can improve the versatility and flexibility of presenting/playing audios. The technical solutions are as follows.

According to one aspect, a method for playing audios is provided. The method is applicable to a terminal and includes:
  receiving an instruction for playing a target audio;
  acquiring a vibration file corresponding to the target audio and configured to control a vibration motor of the terminal, wherein the vibration file includes a vibration intensity and a vibration frequency;
  acquiring and decoding the target audio, and synchronously playing decoded data of the target audio and the vibration file; and
  controlling the vibration motor of the terminal to vibrate based on the vibration intensity and the vibration frequency included in the vibration file.

In some embodiments, the vibration file further includes vibration intensity variation information and vibration frequency variation information, wherein the vibration intensity variation information indicates variations of the vibration intensity along with time in a corresponding vibration period, and the vibration frequency variation information indicates variations of the vibration frequency along with time in a corresponding vibration period.

In some embodiments, acquiring the vibration file corresponding to the target audio and configured to control the vibration motor includes:
  in the case that the vibration file corresponding to the target audio is stored in the terminal, acquiring the vibration file stored in the terminal; or
  in the case that the vibration file corresponding to the target audio is not stored in the terminal, sending a request for acquiring the vibration to a server to acquire the vibration file corresponding to the target audio, the request carrying an identifier of the target audio; or
  processing the target audio to acquire the vibration file corresponding to the target audio.

In some embodiments, processing the target audio to acquire the vibration file corresponding to the target audio includes:
  acquiring an audio of at least one target percussive instrument by performing sound source separation on the target audio;
  determining at least one beat period from the audio of the at least one target percussive instrument, and determining an instrument type of a target percussive instrument corresponding to the at least one beat period; and
  determining at least one vibration period based on the at least one beat period, determining vibration attribute information corresponding to the at least one vibration period based on the instrument type corresponding to the at least one beat period, and generating the vibration file.

In some embodiments, determining the at least one vibration period based on the at least one beat period includes:
  in the case that a proportion of a total duration of the at least one beat period to an entire duration of the target audio is within a predetermined proportion range, determining the at least one vibration period based on the at least one beat period.

In some embodiments, determining the at least one vibration period based on the at least one beat period includes:
  in the case that a number of the at least one beat period is within a predetermined number range, determining the at least one vibration period based on the at least one beat period.

In some embodiments, processing the target audio to acquire the vibration file corresponding to the target audio includes:
  acquiring an audio of at least one target percussive instrument by performing sound source separation on the target audio;
  determining at least one beat period from the audio of the at least one target percussive instrument, and determining an audio amplitude corresponding to the at least one beat period; and
  determining the at least one vibration period based on the at least one beat period, determining vibration attribute information corresponding to the at least one vibration period based on the audio amplitude corresponding to the at least one beat period, and generating the vibration file.

In some embodiments, determining the audio amplitude corresponding to the at least one beat period includes:
  determining a maximum audio amplitude among audio amplitudes at all time points of each beat period of the at least one beat period as an audio amplitude corresponding to the beat period.

In some embodiments, determining the at least one vibration period based on the at least one beat period includes:
  in the case that a proportion of a total duration of the at least one beat period to an entire duration of the target audio is within a predetermined proportion range, determining the at least one vibration period based on the at least one beat period.

In some embodiments, determining the at least one vibration period based on the at least one beat period includes:
  in the case that a number of the at least one beat period is within a predetermined number range, determining the at least one vibration period based on the at least one beat period.

In some embodiments, synchronously playing the decoded data of the target audio and the vibration file includes:
in the case that a predetermined duration elapses upon receipt of the instruction for playing the target audio, synchronously playing the decoded data of the target audio and the vibration file.

According to another aspect, a method for playing audios is provided. The method is applicable to a server and includes:
receiving, from a terminal, a request for acquiring a target audio; and
sending the target audio, and a vibration file corresponding to the target audio and configured to control a vibration motor of the terminal to the terminal, such that the terminal decodes the target audio, plays decoded data of the target audio and the vibration file synchronously, and controls the vibration motor of the terminal to vibrate based on a vibration intensity and a vibration frequency in the vibration file.

In some embodiments, the method further includes:
acquiring an audio of at least one target percussive instrument by performing sound source separation on the target audio;
determining at least one beat period from the audio of the at least one target percussive instrument, and determining an instrument type of a target percussive instrument corresponding to the at least one beat period; and
determining at least one vibration period based on the at least one beat period, determining vibration attribute information corresponding to the at least one vibration period based on the instrument type corresponding to the at least one beat period, and generating the vibration file.

In some embodiments, determining the at least one vibration period based on the at least one beat period includes:
in the case that a proportion of a total duration of the at least one beat period to an entire duration of the target audio is within a predetermined proportion range, determining the at least one vibration period based on the at least one beat period.

In some embodiments, determining the at least one vibration period based on the at least one beat period includes:
in the case that a number of the at least one beat period is within a predetermined number range, determining the at least one vibration period based on the at least one beat period.

In some embodiments, the method further includes:
acquiring an audio of at least one target percussive instrument by performing sound source separation on the target audio;
determining at least one beat period from the audio of the at least one target percussive instrument, and determining an audio amplitude corresponding to the at least one beat period; and
determining at least one vibration period based on the at least one beat period, determining vibration attribute information corresponding to the at least one vibration period based on the audio amplitude corresponding to the at least one beat period, and generating the vibration file.

In some embodiments, determining the audio amplitude corresponding to the at least one beat period includes:
determining a maximum audio amplitude among audio amplitudes at all time points of each beat period of the at least one beat period as an audio amplitude corresponding to the beat period.

In some embodiments, determining the at least one vibration period based on the at least one beat period includes:
in the case that a proportion of a total duration of the at least one beat period to an entire duration of the target audio is within a predetermined proportion range, determining the at least one vibration period based on the at least one beat period.

In some embodiments, determining the at least one vibration period based on the at least one beat period includes:
in the case that a number of the at least one beat period is within a predetermined number range, determining the at least one vibration period based on the at least one beat period.

According to another aspect, an apparatus for playing audios is provided. The apparatus is applicable to a terminal and includes:
an acquiring module, configured to receive an instruction for playing a target audio, and acquiring a vibration file corresponding to the target audio and configured to control a vibration motor of the terminal, wherein the vibration file includes a vibration intensity and a vibration frequency;
a playing module, configured to acquire and decode the target audio, and synchronously play decoded data of the target audio and the vibration file; and
a controlling module, configured to control the vibration motor of the terminal to vibrate based on the vibration intensity and the vibration frequency in the vibration file.

In some embodiments, the vibration file further includes vibration intensity variation information and vibration frequency variation information, wherein the vibration intensity variation information indicates variations of the vibration intensity along with time in a corresponding vibration period, and the vibration frequency variation information indicates variations of the vibration frequency along with time in a corresponding vibration period.

In some embodiments, the acquiring module is configured to:
in the case that the vibration file corresponding to the target audio is stored in the terminal, acquire the vibration file stored in the terminal; or
in the case that the vibration file corresponding to the target audio is not stored in the terminal, send a request for acquiring the vibration file to a server to acquire the vibration file corresponding to the target audio, the request carrying an identifier of the target audio; or
process the target audio to acquire the vibration file corresponding to the target audio.

In some embodiments, the apparatus further includes a processing module, configured to:
acquire an audio of at least one target percussive instrument by performing sound source separation on the target audio;
determine at least one beat period from the audio of the at least one target percussive instrument, and determine an instrument type of a target percussive instrument corresponding to the at least one beat period; and
determine at least one vibration period based on the at least one beat period, determine vibration attribute information corresponding to the at least one vibration period based on the instrument type corresponding to the at least one beat period, and generate the vibration file.

In some embodiments, the processing module is configured to:
in the case that a proportion of a total duration of the at least one beat period to an entire duration of the target audio is within a predetermined proportion range, determine the at least one vibration period based on the at least one beat period.

In some embodiments, the processing module is configured to:
in the case that a number of the at least one beat period is within a predetermined number range, determine the at least one vibration period based on the at least one beat period.

In some embodiments, the processing module is configured to:
acquire an audio of at least one target percussive instrument by performing sound source separation on the target audio;
determine at least one beat period from the audio of the at least one target percussive instrument, and determine an audio amplitude corresponding to the at least one beat period; and
determine at least one vibration period based on the at least one beat period, determine vibration attribute information corresponding to the at least one vibration period based on the audio amplitude corresponding to the at least one beat period, and generate the vibration file.

In some embodiments, the processing module is configured to:
determine a maximum audio amplitude among audio amplitudes at all time points of each beat period of the at least one beat period as an audio amplitude corresponding to the beat period.

In some embodiments, the processing module is configured to:
in the case that a proportion of a total duration of the at least one beat period to an entire duration of the target audio is within a predetermined proportion range, determine the at least one vibration period based on the at least one beat period.

In some embodiments, the processing module is configured to:
in the case that a number of the at least one beat period is within a predetermined number range, determine the at least one vibration period based on the at least one beat period.

In some embodiments, the playing module is configured to:
in the case that a predetermined duration elapses upon receipt of the instruction for playing the target audio, synchronously play the decoded data of the target audio and the vibration control information.

According to another aspect, an apparatus for playing audios is provided. The apparatus is applicable to a server and includes:
a receiving module, configured to receive, from the terminal, a request for acquiring a target audio; and
a sending module, configured to send the target audio, and a vibration file corresponding to the target audio and configured to control a vibration motor of the terminal to the terminal, such that the terminal decodes the target audio, plays decoded data of the target audio and the vibration file synchronously, and controls the vibration motor of the terminal to vibrate based on a vibration intensity and a vibration frequency in the vibration file.

In some embodiments, the apparatus further includes a processing module, the processing module is configured to:
acquire an audio of at least one target percussive instrument by performing sound source separation on the target audio;
determine at least one beat period from the audio of the at least one target percussive instrument, and determine an instrument type of a target percussive instrument corresponding to the at least one beat period; and
determine at least one vibration period based on the at least one beat period, determine vibration attribute information corresponding to the at least one vibration period based on the instrument type corresponding to the at least one beat period and a pre-stored correspondence between an instrument type and vibration attribute information, and generate the vibration file.

In some embodiments, the processing module is configured to:
in the case that a proportion of a total duration of the at least one beat period to an entire duration of the target audio is within a predetermined proportion range, determine the at least one vibration period based on the at least one beat period.

In some embodiments, the processing module is configured to:
in the case that a number of the at least one beat period is within a predetermined number range, determine the at least one vibration period based on the at least one beat period.

In some embodiments, the processing module is configured to:
acquire an audio of at least one target percussive instrument by performing sound source separation on the target audio;
determine at least one beat period from the audio of the at least one target percussive instrument, and determine an audio amplitude corresponding to the at least one beat period; and
determine at least one vibration period based on the at least one beat period, determine vibration attribute information corresponding to the at least one vibration period based on the audio amplitude corresponding to the at least one beat period, and generate the vibration file.

In some embodiments, the processing module is configured to:
determine a maximum audio amplitude among audio amplitudes at all time points of each beat period of the at least one beat period as an audio amplitude corresponding to the beat period.

In some embodiments, the processing module is configured to:
in the case that a proportion of a total duration of the at least one beat period to an entire duration of the target audio is within a predetermined proportion range, determine the at least one vibration period based on the at least one beat period.

In some embodiments, the processing module is configured to:
in the case that a number of the at least one beat period is within a predetermined number range, determine the at least one vibration period based on the at least one beat period.

According to another aspect, a system for playing audios is provided. The system includes a terminal and a server, wherein the terminal is configured to receive an instruction for playing a target audio; acquiring a vibration file corresponding to the target audio and configured to control a vibration motor of the terminal, wherein the vibration file includes a vibration intensity and a vibration frequency; acquire and decode the target audio, and synchronously play decoded data of the target audio and the vibration file; and control the vibration motor of the terminal to vibrate based on the vibration intensity and the vibration frequency in the vibration file; and the server is configured to receive, from the terminal, a request for acquiring the target audio, and send the target audio and the vibration file corresponding to the target audio and configured to control the vibration motor to the terminal.

According to another aspect, a computer device is provided. The computer device includes a processor and a memory, wherein the memory stores at least one instruction, wherein at least one instruction, when loaded and executed by the processor, causes the processor to perform an operation executed in the above method for playing audios.

According to another aspect, a computer-readable storage medium is provided. The storage medium stores at least one instruction, wherein at least one instruction, when loaded and executed by the processor, cause a processor to perform an operation executed in the above method for playing audios.

The technical solutions according to the embodiments of the present disclosure have beneficial effects as follows.

By acquiring vibration control information corresponding to a target audio, and controlling a terminal to vibrate based on the vibration control information when the target audio is played, the terminal is enabled to not only play the audio to a user through a speaker or an earphone, but also present the audio via vibration. Therefore, the versatility and flexibility of presenting/playing audios by the terminal are improved.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

For clearer descriptions of the objectives, technical solutions, and advantages of the present disclosure, embodiments of the present disclosure are described in detail below with reference to the accompanying drawings.

A method for playing audios provided in the present disclosure may be implemented by a terminal or jointly performed by the terminal and a server. The terminal may run an application program having an audio playing function, for example, an audio playing application program. The terminal may include components such as a microphone, an earphone, a speaker, and a camera. In addition, the terminal further includes a vibration motor. The vibration motor may be but is not limited to a rotary motor or a linear motor. The terminal has a communication function, can access to the Internet, and may be a mobile phone, a tablet computer, an intelligent wearable device, a desktop computer, a notebook computer, or the like. The server may be a background server for the application program having the audio playing function, and may establish a communication with the terminal. The server may be an independent server or a server group. In the case that the server is an independent server, the server may be responsible for all processing in the following solutions; in the case that the server is a server group, different servers in the server group are respectively responsible for different processing in the following solutions. A specific allocation condition of the processing may be specified by a technical person freely according to actual needs, details of which are not described herein again.

A user may download music from a network by using a music playing application program installed in the terminal, and play the downloaded music by using the terminal. A person may sense an intensity of a musical rhythm through a tactile sensation in addition to an auditory sensation. For example, when moving close to a high-power stereo which is playing music, a person may sense vibration generated by the stereo which is playing a super bass. According to this embodiment of the present disclosure, when music is played by the terminal, the vibration motor in the terminal may be controlled to vibrate, thereby giving auditory and tactile feedback to the user.

Figure 1:
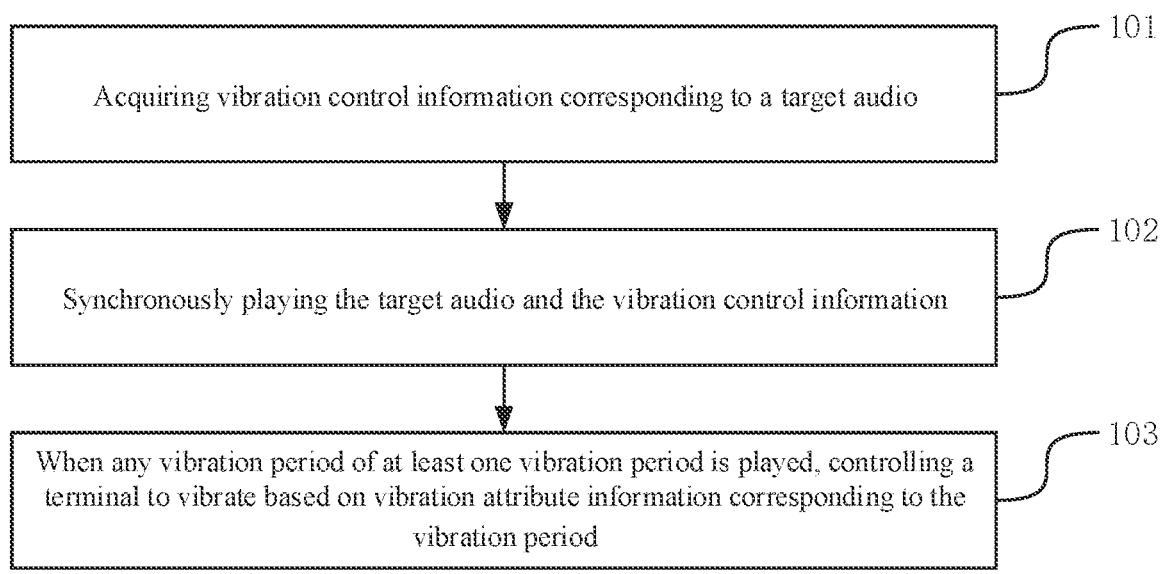
FIG. 1 is a flowchart of a method for playing audios according to an embodiment of the present disclosure.

FIG. 1 is a flowchart of a method for playing audios according to an embodiment of the present disclosure. This embodiment may be applicable to a terminal. Referring to FIG. 1, the method includes the following steps.

In step 101, vibration control information corresponding to a target audio is acquired.

At least one vibration period and vibration attribute information corresponding to the at least one vibration period are recorded in the vibration control information, and each vibration period corresponds to a beat period of a target percussive instrument in the target audio.

The vibration control information may be a vibration file used for controlling a terminal to vibrate. The terminal may control a vibration motor in the terminal to vibrate by executing the vibration file. The vibration attribute information may include a vibration intensity and a vibration frequency of each vibration period, and may further include information such as vibration intensity variation information and vibration frequency variation information in each vibration period. In other words, the vibration intensity and the vibration frequency of the vibration period may vary with time.

In some embodiments, a music playing application program may be provided with a sound effect option. After clicking the sound effect option, a user may select various sound effects provided in the music playing application program. The various sound effects include a motion-sensing sound effect. After the user selects the motion-sensing sound effect, when playing the target audio by using the music playing application program, the user may determine whether the vibration control information corresponding to the target audio is stored locally. In the case that the vibration control information corresponding to the target audio is not stored locally, the user may send a request for acquiring the vibration control information to a server to acquire the vibration control information corresponding to the target audio, the request carrying an identifier of the target audio. Alternatively, the terminal may process the target audio to acquire the vibration control information corresponding to the target audio. The target audio is pre-stored in the terminal or downloaded by using the music playing application program.

There may be the following two processing modes by which the terminal processes the target audio to acquire the vibration control information corresponding to the target audio.

Mode 1: an audio of at least one target percussive instrument is acquired by performing sound source separation on the target audio; at least one beat period is determined from the audio of the at least one target percussive instrument, and an audio amplitude corresponding to the at least one beat period is determined; at least one vibration period is determined based on the at least one beat period, vibration attribute information corresponding to the at least one vibration period is determined based on the audio amplitude corresponding to the at least one beat period, and the vibration control information is generated.

In some embodiments, the target audio may be input into a pre-trained sound source separation model in the terminal to acquire an audio of a target percussive instrument corresponding to the target audio. There may be one or more target percussive instruments, such as a drum set or a triangolo. After the audio of the target percussive instrument corresponding to the target audio is determined, each beat period of the target percussive instrument, namely, a start moment and an end moment of a beat sound of the target percussive instrument, may be determined based on dynamic variation of a waveform in the audio of the target percussive instrument, and an amplitude of an audio in each beat period may be determined. For example, a time point at which the waveform in the audio of the target percussive instrument starts to vibrate may be determined as the start moment of the beat sound of the target percussive instrument; and a time point at which the waveform in the audio of the target percussive instrument stops vibrating may be determined as the end moment of the beat sound of the target percussive instrument. Then, a vibration period of which start moment and end moment are the same as those of each beat period of the target percussive instrument is determined; and vibration attribute information corresponding to each vibration period is determined based on the amplitude of the audio in the corresponding beat period. The average audio amplitude or maximum audio amplitude of all audio frames of the beat period may be used as an audio amplitude corresponding to the beat period; and then, vibration attribute information corresponding to a vibration period may be determined according to a pre-stored correspondence between an audio amplitude and vibration attribute information. Finally, the vibration control information corresponding to the audio is generated based on the vibration period and the vibration attribute information corresponding to the vibration period.

Mode 2: an audio of at least one target percussive instrument is acquired by performing sound source separation on the target audio; at least one beat period is determined from the audio of the at least one target percussive instrument, and an instrument type of a target percussive instrument corresponding to the at least one beat period is determined; at least one vibration period is determined based on the at least one beat period, vibration attribute information corresponding to the at least one vibration period is determined based on the instrument type corresponding to the at least one beat period and a pre-stored correspondence between an instrument type and vibration attribute information, and the vibration control information is generated.

In some embodiments, the target audio is input into a pre-trained sound source separation model to acquire an audio of a target percussive instrument corresponding to the target audio. Each beat period of the target percussive instrument and a corresponding vibration period are determined based on dynamic variation of a waveform in the audio of the target percussive instrument. Then, audio data corresponding to each beat period is converted into frequency-domain data. Each instrument type of the target percussive instrument is determined according to distribution of high frequencies and low frequencies in the frequency-domain data. For example, in the case that a drum set includes a snare drum, a bass drum, and cymbals, the instrument type may be determined as the cymbals when a proportion of the high frequencies is large, determined as the bass drum when a proportion of the low frequencies is large, or determined as the snare drum in other scenarios. Finally, the vibration attribute information corresponding to the vibration period is acquired according to correspondences which are pre-stored in the terminal and are between different instrument types and corresponding vibration attribute information; and the vibration control information corresponding to the target audio is generated based on the vibration period and the vibration attribute information corresponding to the vibration period.

In step 102, the target audio and the vibration control information are played synchronously.

In some embodiments, when the user clicks a play option which corresponds to the target audio and is in the music playing application program, an audio playing application program may send an instruction for playing the target audio to the terminal; the target audio may be played through a speaker or an externally connected earphone; and the vibration control information corresponding to the target audio is executed when the target audio starts to be played.

In some embodiments, when the terminal receives the instruction for playing the target audio, the target audio is acquired and decoded; and in the case that a predetermined duration elapses upon receipt of the instruction for playing the target audio, the decoded data of the target audio and the vibration control information are played synchronously.

In some embodiments, after receiving the instruction for playing the target audio, the terminal may decode the target audio to generate decoded data which can be played by the terminal. However, because a processing capability of a processor in the terminal is unstable in practice, duration by which the terminal decodes the target audio is uncertain. As a result, play time of the target audio is uncertain, such that the vibration period in the vibration control information may not coincide with the beat period in the target audio. The predetermined duration may be set in the terminal to ensure that the vibration period in the vibration control information coincides with the beat period in the target audio. When the instruction for playing the target audio is received, the terminal may decode the target audio within the predetermined duration. The decoded data of the target audio may start to be played when the predetermined duration is reached after the terminal receives the instruction for playing the target audio. At the same time, the vibration control information is performed, and the terminal is controlled to vibrate based on the vibration control information corresponding to the target audio.

In step 103, when any vibration period of at least one vibration period is played, a terminal is controlled to vibrate based on vibration attribute information corresponding to the vibration period. That is, when the target audio is played in any vibration period of at least one vibration period, a terminal is controlled to vibrate based on vibration attribute information corresponding to the vibration period.

In some embodiments, when the terminal plays the target audio, the music playing application program may control the vibration motor in the terminal to vibrate based on the vibration period and the vibration attribute information which are recorded in the vibration control information corresponding to the target audio. A vibration control instruction may be sent to the terminal when a predetermined sending duration before the beat period in the target audio is reached during playing of the target audio by the terminal, wherein the vibration control instruction carries vibration attribute information and a vibration period, namely, a start time point at which the terminal is controlled to vibrate, vibration duration, a vibration frequency, and a vibration amplitude within the vibration duration, and the like. After the control instruction is received, when the beat period in the target audio is played, the terminal may control the vibration motor in the terminal to vibrate based on the vibration attribute information and the vibration period which are carried in the vibration control instruction.

According to this embodiment of the present disclosure, by acquiring vibration control information corresponding to a target audio, and controlling a terminal to vibrate based on the vibration control information when the target audio is played, the terminal is enabled to not only play the audio to a user through a speaker or an earphone, but also present the audio via vibration. Therefore, the versatility and flexibility of presenting/playing audios by the terminal are improved.

Figure 2:
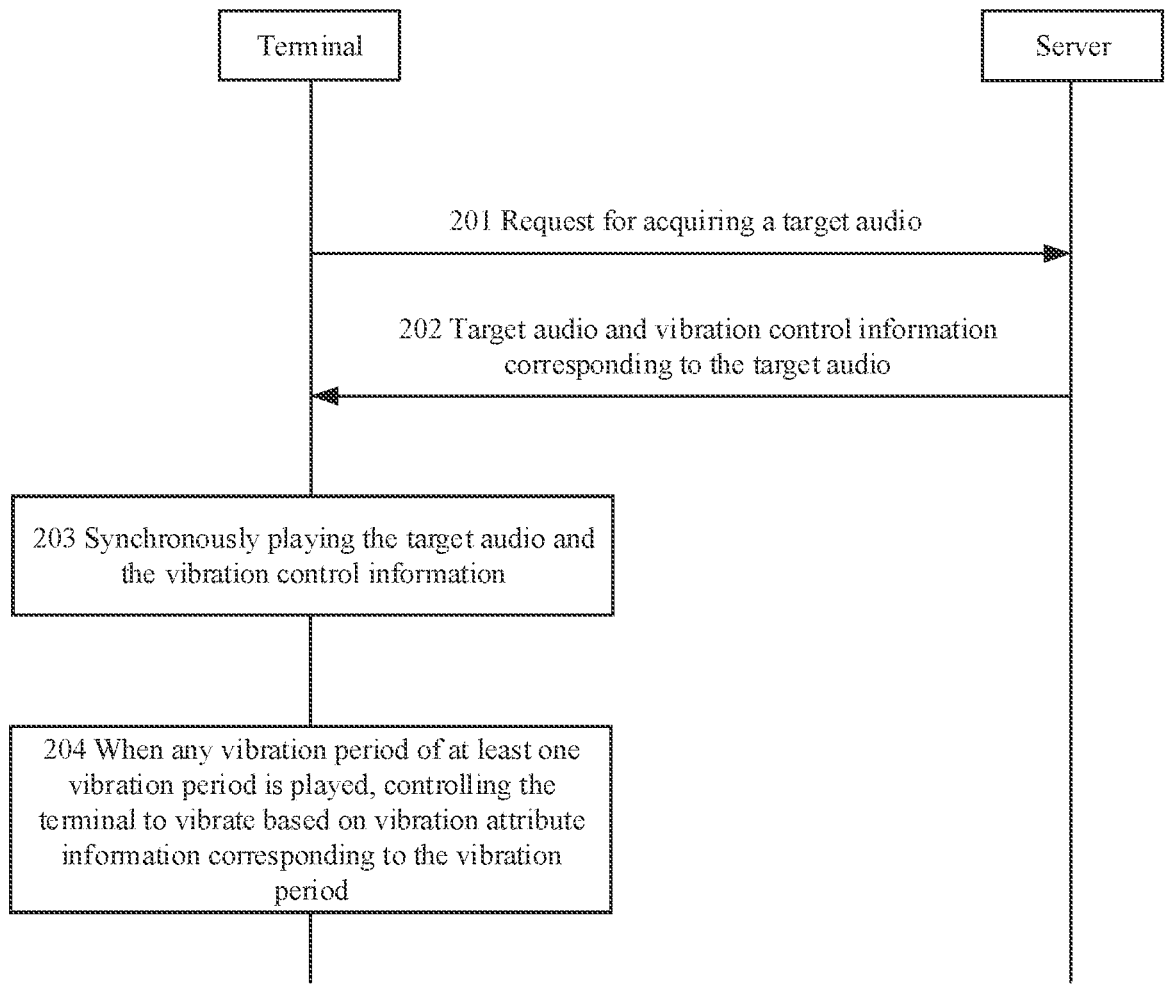
FIG. 2 is a flowchart of a method for playing audios according to an embodiment of the present disclosure.

FIG. 2 shows a method for playing audios according to an embodiment of the present disclosure. In this embodiment, a flow of the method for playing audios is performed jointly by a terminal and a server. Referring to FIG. 2, the method includes the following steps.

In step 201, the server receives, from a terminal, a request for acquiring a target audio.

In some embodiments, a user may operate a music playing application program to play the target audio. When the target audio is not stored in the terminal, the terminal may send a request for acquiring the target audio to the server. After receiving the request for acquiring the target audio, the server may determine whether vibration control information corresponding to the target audio is present.

In step 202, the server sends the target audio and vibration control information corresponding to the target audio to the terminal.

At least one vibration period and vibration attribute information corresponding to the at least one vibration period are recorded in the vibration control information, and each vibration period corresponds to a beat period of a target percussive instrument in the target audio. The vibration control information indicates that in a process of playing the target audio by the terminal, when any vibration period of the at least one vibration period is played, the terminal is controlled to vibrate based on vibration attribute information corresponding to the vibration period.

In some embodiments, when the vibration control information corresponding to the target audio is present, the server may send the target audio and the vibration control information corresponding to the target audio to the terminal.

Before sending the vibration control information to the terminal, the server may process audios in an audio library to acquire vibration control information corresponding to each audio. There may be two processing modes as follows.

Mode 1: an audio of at least one target percussive instrument is acquired by performing sound source separation on the target audio; at least one beat period is determined from the audio of the at least one target percussive instrument, and an instrument type of a target percussive instrument corresponding to the at least one beat period is determined; at least one vibration period is determined based on the at least one beat period, vibration attribute information corresponding to the at least one vibration period is determined based on the instrument type corresponding to the at least one beat period and a pre-stored correspondence between an instrument type and vibration attribute information, and the vibration control information is generated.

Figure 3:
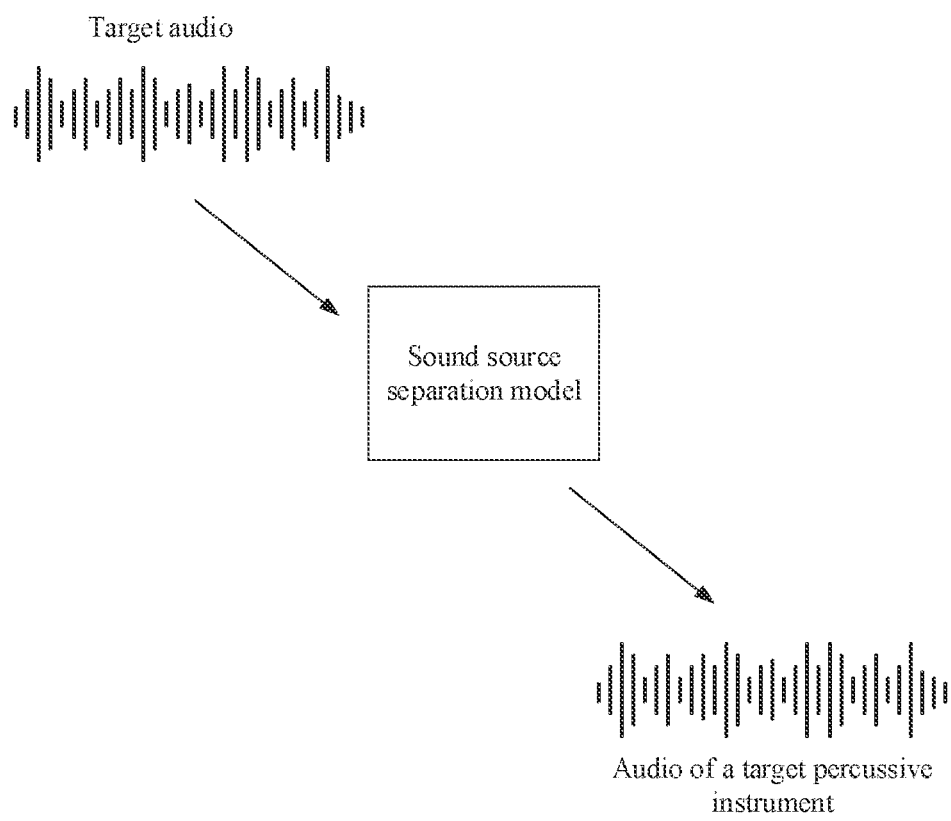
FIG. 3 is a schematic diagram of a method for playing audios according to an embodiment of the present disclosure.
Figure 4:
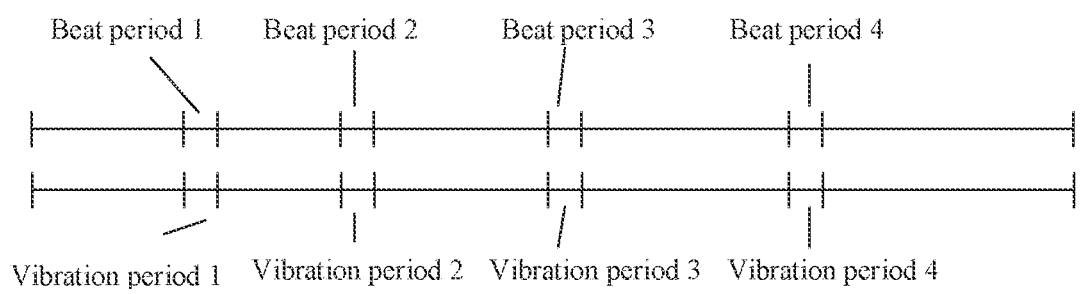
FIG. 4 is a schematic diagram of a method for playing audios according to an embodiment of the present disclosure.

In some embodiments, in addition to audios of various types of music, the audio library may further store category information corresponding to the music, such as lyric music, pure music, hip-hop music, and electronic music. Generally, it is inappropriate to vibrate the terminal for playing of music such as lyric music and pure music which has a slow rhythm. Therefore, processing music such as lyric music and pure music which has a slow rhythm may be skipped. The server may select an audio which needs to be processed and for which vibration control information needs to be generated based on category information of music. For example, the server may process only audios corresponding to hip-hop music and electronic music. Generally, an audio includes a plurality of pieces of audio track information. Different instruments as well as different people' voices in the audio correspond to different pieces of audio track information. The server may acquire audio track information corresponding to the target percussive instrument, to acquire the audio of the target percussive instrument. When failing to directly acquire each piece of audio track information of an audio, the server may acquire the audio of the target percussive instrument corresponding to the audio through a pre-trained sound source separation model, as shown in FIG. 3. After the audio of the target percussive instrument corresponding to the target audio is determined, each beat period of the target percussive instrument, namely, a start moment and an end moment of a beat sound of the target percussive instrument, may be determined based on dynamic variation of a waveform in the audio of the target percussive instrument, and an amplitude of an audio in each beat period may be determined. As shown in FIG. 4, the server may set vibration periods having the same duration based on the determined beat period of the target percussive instrument; and determine vibration attribute information corresponding to the vibration periods based on the amplitude of the audio in each beat period, thereby acquiring the vibration control information corresponding to the audio.

In some embodiments, a maximum audio amplitude among audio amplitudes at all time points of each beat period of the at least one beat period is determined as an audio amplitude corresponding to the beat period.

In some embodiments, the maximum audio amplitude in all beat periods in the target audio may be determined as an amplitude corresponding to an audio of the beat period. The vibration attribute information corresponding to the vibration period is determined based on an audio amplitude and vibration attribute information which are pre-stored. Finally, the vibration control information corresponding to the audio is generated based on the vibration period and the vibration attribute information corresponding to the vibration period.

Mode 2: an audio of at least one target percussive instrument is acquired by performing sound source separation on the target audio; at least one beat period is determined from the audio of the at least one target percussive instrument, and an audio amplitude corresponding to the at least one beat period is determined; at least one vibration period is determined based on the at least one beat period, vibration attribute information corresponding to the at least one vibration period is determined based on the audio amplitude corresponding to the at least one beat period, and the vibration control information is generated.

In some embodiments, the server may input the target audio into a pre-trained sound source separation model to acquire an audio of a target percussive instrument corresponding to the target audio. Each beat period of the target percussive instrument and a corresponding vibration period are determined based on dynamic variation of a waveform in the audio of the target percussive instrument. Then, audio data corresponding to each beat period is converted into frequency-domain data. Each instrument type of the target percussive instrument is determined according to distribution of high frequencies and low frequencies in the frequency-domain data. For example, in the case that a drum set includes a snare drum, a bass drum, and cymbals, the instrument type may be determined as the cymbals when a proportion of the high frequencies is large, determined as the bass drum when a proportion of the low frequencies is large, or determined as the snare drum in other scenarios. Finally, the vibration attribute information corresponding to the vibration period is acquired according to correspondences which are pre-stored in the terminal and are between different instrument types and corresponding vibration attribute information; and the vibration control information corresponding to the target audio is generated based on the vibration period and the vibration attribute information corresponding to the vibration period.

In some embodiments, when processing the audios in the audio library to acquire vibration control information corresponding to each audio, the server may detect whether the audio is suitable for the terminal to vibrate while playing based on information in an audio, and generate vibration control information of an audio which is suitable for the terminal to vibrate while playing. The above process may determine by the following two modes.

Mode 1: in the case that a proportion of a total duration of the at least one beat period to an entire duration of the target audio is within a predetermined proportion range, the at least one vibration period is determined based on the at least one beat period.

In some embodiments, the total duration of all beat periods in the target audio may be determined after duration of each beat period in the target audio is determined. In the case that a proportion of the total duration of all the beat periods to the entire duration of the target audio is within the predetermined proportion range, the vibration period may be determined based on the determined duration of each beat period in the target audio; and vibration attribute information corresponding to the vibration period may be determined based on an audio amplitude corresponding to the beat period, thereby acquiring the vibration control information. Finally, the vibration control information corresponding to the target audio is uploaded to the music library.

Mode 2: in the case that a number of the at least one beat period is within a predetermined number range, the at least one vibration period is determined based on the at least one beat period.

In some embodiments, the number of all beat periods in the target audio may be determined after duration of each beat period in the target audio is determined. In the case that the number of all the beat periods is within the predetermined number range, the vibration period may be determined based on the determined duration of each beat period in the target audio, and vibration attribute information corresponding to the vibration period may be determined based on an audio amplitude corresponding to the beat period, thereby acquiring the vibration control information. Finally, the vibration control information corresponding to the target audio is uploaded to the music library.

In addition, after generating the vibration control information, the server may further determine, by detecting the generated vibration control information, whether an audio corresponding to the vibration control information is suitable for the terminal to vibrate while playing based on the vibration control information.

In some embodiments, the server may detect the vibration control information before uploading the vibration control information to the audio library. When a proportion of the total duration of all the beat periods to the entire duration of the target audio is out of the predetermined proportion range, or when the number of all the beat periods is out of the predetermined number range, the vibration control information may be deleted, that is, the vibration control information is not uploaded to the music library. The proportion of the total duration of all the beat periods and the number of all the beat periods are recorded in the vibration control information.

In step 203, the terminal plays the target audio and the vibration control information synchronously.

In some embodiments, the terminal receives, from the server, the target audio and the vibration control information corresponding to the target audio. Then, an audio playing application program may send an instruction for playing the target audio to the terminal; the target audio may be played through a speaker or an externally connected earphone; and the vibration control information corresponding to the target audio is performed when the audio starts to be played.

In some embodiments, the instruction for playing the target audio is received; and the target audio is acquired and decoded; and in the case that a predetermined duration elapses upon receipt of the instruction for playing the target audio, the decoded data of the target audio is played.

In some embodiments, after receiving the instruction for playing the target audio, the terminal may decode the target audio to generate decoded data which can be played by the terminal. However, because a processing capability of a processor in the terminal is unstable in practice, duration by which the terminal decodes the target audio is uncertain. As a result, play time of the target audio is uncertain, such that the vibration period in the vibration control information may not coincide with the beat period in the target audio. The predetermined duration may be set in the terminal to ensure that the vibration period in the vibration control information coincides with the beat period in the target audio. When the instruction for playing the target audio is received, the terminal may decode the target audio within the predetermined duration. The decoded data of the target audio may start to be played when the predetermined duration is reached after the terminal receives the instruction for playing the target audio. At the same time, the terminal is controlled to vibrate based on the vibration control information corresponding to the target audio.

In step 204, when any vibration period of at least one vibration period is played, the terminal is controlled to vibrate based on vibration attribute information corresponding to the vibration period.

In some embodiments, when the terminal plays the audio, the music playing application program may control the vibration motor in the terminal to vibrate based on the vibration period and the vibration attribute information which are recorded in the vibration control information corresponding to the target audio. A vibration control instruction may be sent to the terminal when a predetermined sending duration before the beat period in the target audio is reached during playing of the target audio by the terminal, wherein the vibration control instruction carries vibration attribute information and a vibration period. After the control instruction is received, when the beat period in the target audio is played, the terminal may control the vibration motor in the terminal to vibrate based on the vibration attribute information and the vibration period which are carried in the vibration control instruction.

According to this embodiment of the present disclosure, by acquiring vibration control information corresponding to a target audio, and controlling a terminal to vibrate based on the vibration control information when the target audio is played, the terminal is enabled to not only play the audio to a user through a speaker or an earphone, but also present the audio via vibration. Therefore, the versatility and flexibility of presenting/playing audios by the terminal are improved.

All the foregoing optional technical solutions may be randomly combined to form optional embodiments of the present disclosure. Details are not described herein.

Figure 5:
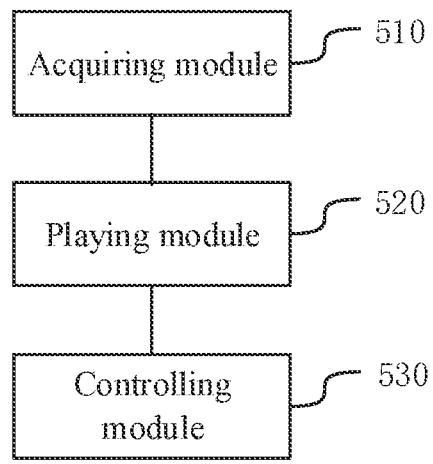
FIG. 5 is a schematic structural diagram of an apparatus for playing audios according to an embodiment of the present disclosure.

FIG. 5 shows an apparatus for playing audios according to an embodiment of the present disclosure. The apparatus may be the terminal in the foregoing embodiments. As shown in FIG. 5, the apparatus includes:

an acquiring module 510, configured to receive an instruction for playing a target audio, and acquiring a vibration file corresponding to the target audio and configured to control a vibration motor of the terminal, wherein the vibration file includes a vibration intensity and a vibration frequency;

a playing module 520, configured to acquire and decode the target audio, and synchronously play decoded data of the target audio and the vibration file; and a controlling module 530, configured to control the vibration motor of the terminal to vibrate based on the vibration intensity and the vibration frequency in the vibration file.

In some embodiments, the vibration file further includes vibration intensity variation information and vibration frequency variation information, wherein the vibration intensity variation information indicates variations of the vibration intensity along with time in a corresponding vibration period, and the vibration frequency variation information indicates variations of the vibration frequency along with time in a corresponding vibration period.

In some embodiments, the acquiring module 510 is configured to:
in the case that the vibration file corresponding to the target audio is stored in the terminal, acquire the vibration file stored in the terminal; or
in the case that the vibration file corresponding to the target audio is not stored in the terminal, send a request for acquiring the vibration file to a server to acquire the vibration file corresponding to the target audio, the request carrying an identifier of the target audio; or
process the target audio to acquire the vibration file corresponding to the target audio.

In some embodiments, the apparatus further includes a processing module, the processing module is configured to:
acquire an audio of at least one target percussive instrument by performing sound source separation on the target audio;
determine at least one beat period from the audio of the at least one target percussive instrument, and determine an instrument type of a target percussive instrument corresponding to the at least one beat period; and
determine at least one vibration period based on the at least one beat period, determine vibration attribute information corresponding to the at least one vibration period based on the instrument type corresponding to the at least one beat period and a pre-stored correspondence between an instrument type and vibration attribute information, and generate the vibration file.

In some embodiments, the processing module is configured to:
in the case that a proportion of a total duration of the at least one beat period to an entire duration of the target audio is within a predetermined proportion range, determine the at least one vibration period based on the at least one beat period.

In some embodiments, the processing module is configured to:
in the case that a number of the at least one beat period is within a predetermined number range, determine the at least one vibration period based on the at least one beat period.

In some embodiments, the apparatus further includes a processing module, the processing module is configured to:
acquire an audio of at least one target percussive instrument by performing sound source separation on the target audio;
determine at least one beat period from the audio of the at least one target percussive instrument, and determine an audio amplitude corresponding to the at least one beat period; and
determine at least one vibration period based on the at least one beat period, determine vibration attribute information corresponding to the at least one vibration period based on the audio amplitude corresponding to the at least one beat period, and generate the vibration file.

In some embodiments, the processing module is configured to:
determine a maximum audio amplitude among audio amplitudes at all time points of each beat period of the at least one beat period as an audio amplitude corresponding to the beat period.

In some embodiments, the processing module is configured to:
in the case that a proportion of a total duration of the at least one beat period to an entire duration of the target audio is within a predetermined proportion range, determine the at least one vibration period based on the at least one beat period.

In some embodiments, the processing module is configured to:
in the case that a number of the at least one beat period is within a predetermined number range, determine the at least one vibration period based on the at least one beat period.

In some embodiments, the playing module 520 is configured to:
in the case that a predetermined duration elapses upon receipt of the instruction for playing the target audio, synchronously play the decoded data of the target audio and the vibration control information.

Figure 6:
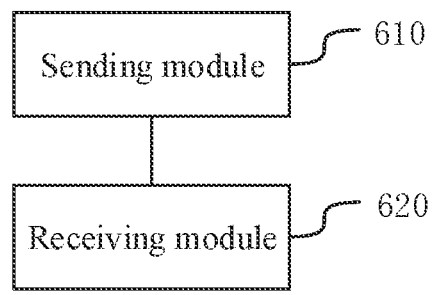
FIG. 6 is a schematic structural diagram of an apparatus for playing audios according to an embodiment of the present disclosure.

FIG. 6 shows an apparatus for playing audios according to an embodiment of the present disclosure. The apparatus may be the server in the foregoing embodiments. As shown in FIG. 6, the apparatus includes:
a receiving module 610, configured to receive, from a terminal, a request for acquiring a target audio; and
a sending module 620, configured to send the target audio, and a vibration file corresponding to the target audio and configured to control a vibration motor of the terminal to the terminal, such that the terminal decodes the target audio, plays decoded data of the target audio and the vibration file synchronously, and controls the vibration motor of the terminal to vibrate based on a vibration intensity and a vibration frequency in the vibration file.

In some embodiments, the apparatus further includes a processing module, the processing module is configured to:
acquire an audio of at least one target percussive instrument by performing sound source separation on the target audio;
determine at least one beat period from the audio of the at least one target percussive instrument, and determine an instrument type of a target percussive instrument corresponding to the at least one beat period; and
determine the at least one vibration period based on the at least one beat period, determine vibration attribute information corresponding to the at least one vibration period based on the instrument type corresponding to the at least one beat period and a pre-stored correspondence between an instrument type and vibration attribute information, and generate the vibration file.

In some embodiments, the processing module is configured to:
in the case that a proportion of a total duration of the at least one beat period to an entire duration of the target audio is within a predetermined proportion range, determine the at least one vibration period based on the at least one beat period.

In some embodiments, the processing module is configured to:
in the case that a number of the at least one beat period is within a predetermined number range, determine the at least one vibration period based on the at least one beat period.

In some embodiments, the apparatus further includes a processing module, the processing module is configured to:
acquire an audio of at least one target percussive instrument by performing sound source separation on the target audio;
determine at least one beat period from the audio of the at least one target percussive instrument, and determine an audio amplitude corresponding to the at least one beat period; and
determine at least one vibration period based on the at least one beat period, determine vibration attribute information corresponding to the at least one vibration period based on the audio amplitude corresponding to the at least one beat period, and generate the vibration file.

In some embodiments, the processing module is configured to:
determine, for each beat period, a maximum audio amplitude among audio amplitudes at all time points of the beat period as an audio amplitude corresponding to the beat period.

In some embodiments, the processing module is configured to:
in the case that a proportion of a total duration of the at least one beat period to an entire duration of the target audio is within a predetermined proportion range, determine the at least one vibration period based on the at least one beat period.

In some embodiments, the processing module is configured to:
in the case that a number of the at least one beat period is within a predetermined number range, determine the at least one vibration period based on the at least one beat period.

It needs to be noted that for the apparatus for playing audios provided in the foregoing embodiments, during audio playing, the division of the foregoing functional modules is only an example for description. In practice, the foregoing functions may be allocated to different functional modules as required, that is, the internal structure of the apparatus is divided into different functional modules, to complete all or some functions described above. In addition, the apparatus for playing audios provided in the foregoing embodiments and the embodiments of the method for playing audios belong to the same concept. For a specific implementation process of the apparatus for playing audios, reference may be made to the method embodiments. Details are not described herein again.

Embodiments of the present disclosure further provide a system for playing audios. The system includes a terminal and a server.

The terminal is configured to receive an instruction for playing a target audio; acquiring a vibration file corresponding to the target audio and configured to control a vibration motor of the terminal, wherein the vibration file includes a vibration intensity and a vibration frequency; acquire and decode the target audio, and synchronously play decoded data of the target audio and the vibration file; and control the vibration motor of the terminal to vibrate based on the vibration intensity and the vibration frequency in the vibration file.

The server is configured to receive, from the terminal, a request for acquiring the target audio; and send the target audio and the vibration file corresponding to the target audio and configured to control the vibration motor to the terminal.

Figure 7:
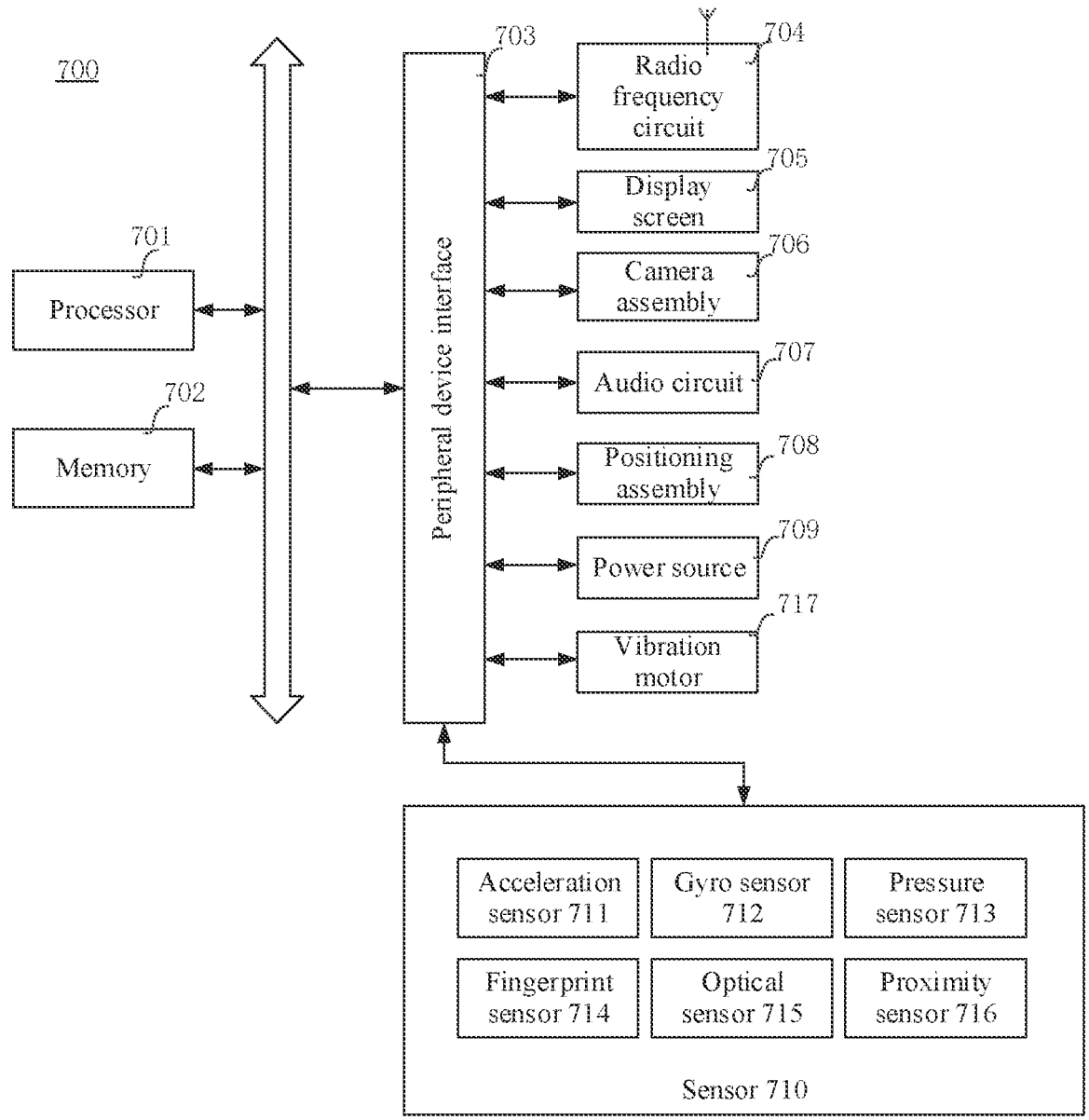
FIG. 7 is a schematic structural diagram of a terminal according to an embodiment of the present disclosure.

FIG. 7 is a structural block diagram of a terminal 700 according to an embodiment of the present disclosure. The terminal 700 may be a smart mobile phone, a tablet computer, a Moving Picture Experts Group Audio Layer III (MP3) player, a Moving Picture Experts Group Audio Layer IV (MP4) player, a notebook computer, or a desktop computer. The terminal 700 may also be called user equipment (UE), a portable terminal, a laptop terminal, a desktop terminal, or the like.

Usually, the terminal 700 includes a processor 701 and a memory 702.

The processor 701 may include one or more processing cores, such as a 4-core processor and an 8-core processor. The processor 701 may be formed by at least one hardware of a digital signal processing (DSP), a field-programmable gate array (FPGA), and a programmable logic array (PLA). The processor 701 may also include a main processor and a coprocessor. The main processor is a processor for processing the data in an awake state, and is also called a central processing unit (CPU). The coprocessor is a low-power-consumption processor for processing the data in a standby state. In some embodiments, the processor 701 may be integrated with a graphics processing unit (GPU), which is configured to render and draw the content that needs to be displayed by a display screen. In some embodiments, the processor 701 may also include an artificial intelligence (AI) processor configured to process computational operations related to machine learning.

The memory 702 may include one or more computer-readable storage media, which may be non-transitory. The memory 702 may also include a high-speed random access memory, as well as a non-volatile memory, such as one or more disk storage devices and flash storage devices. In some embodiments, the non-transitory computer-readable storage medium in the memory 702 is configured to store at least one instruction. The at least one instruction is configured to be executed by the processor 701 to perform the method for playing audios according to the embodiments of the present disclosure.

In some embodiments, the terminal 700 also optionally includes a peripheral device interface 703 and at least one peripheral device. The processor 701, the memory 702, and the peripheral device interface 703 may be connected via a bus or a signal line. Each peripheral device may be connected to the peripheral device interface 703 via a bus, a signal line, or a circuit board. Specifically, the peripheral device includes at least one of a radio frequency circuit 704, a touch display screen 705, a camera assembly 706, an audio circuit 707, a positioning assembly 708, and a power source 709.

The peripheral device interface 703 may be configured to connect at least one peripheral device associated with an input/output (I/O) to the processor 701 and the memory 702. In some embodiments, the processor 701, the memory 702, and the peripheral device interface 703 are integrated on the same chip or circuit board. In some other embodiments, any one or two of the processor 701, the memory 702, and the peripheral device interface 703 may be implemented on a separate chip or circuit board, which is not limited in the present embodiment.

The radio frequency circuit 704 is configured to receive and transmit a radio frequency (RF) signal, which is also referred to as an electromagnetic signal. The radio frequency circuit 704 communicates with a communication network and other communication devices via the electromagnetic signal. The radio frequency circuit 704 converts the electrical signal into the electromagnetic signal for transmission, or converts the received electromagnetic signal into the electrical signal. Optionally, the radio frequency circuit 704 includes an antenna system, an RF transceiver, one or more amplifiers, a tuner, an oscillator, a digital signal processor, a codec chipset, a subscriber identity module card, and the like. The radio frequency circuit 704 may communicate with other terminals via at least one wireless communication protocol. The wireless communication protocol includes, but is not limited to: a metropolitan area network, generations of mobile communication networks (2G, 3G, 4G, and 5G), a wireless local area network and/or a wireless fidelity (Wi-Fi) network. In some embodiments, the radio frequency circuit 704 may further include near field communication (NFC) related circuits, which is not limited in the present disclosure.

The display screen 705 is configured to display a user interface (UI). The UI may include graphics, text, icons, videos, and any combination thereof. When the display screen 705 is a touch display screen, the display screen 705 also has the capacity to acquire touch signals on or over the surface of the display screen 705. The touch signal may be input into the processor 701 as a control signal for processing. In this case, the display screen 705 may also be configured to provide virtual buttons and/or virtual keyboards, which are also referred to as soft buttons and/or soft keyboards. In some embodiments, one display screen 705 may be disposed on the front panel of the terminal 700. In some other embodiments, at least two display screens 705 may be disposed respectively on different surfaces of the terminal 700 or in a folded design. In further embodiments, the display screen 705 may be a flexible display screen disposed on the curved or folded surface of the terminal 700. Even the display screen 705 may have an irregular shape other than a rectangle, that is, the display screen 705 may be an irregular-shaped screen. The display screen 705 may be a light crystal display (LCD) screen, an organic light-emitting diode (OLED) display screen, or the like.

The camera assembly 706 is configured to acquire images or videos. Optionally, the camera assembly 706 includes a front camera and a rear camera. Usually, the front camera is disposed on the front panel of the terminal, and the rear camera is disposed on the back of the terminal. In some embodiments, at least two rear cameras are disposed, and are at least one of a main camera, a depth-of-field camera, a wide-angle camera, and a telephoto camera respectively, so as to realize a background blurring function achieved by fusion of the main camera and the depth-of-field camera, panoramic shooting and virtual reality (VR) shooting functions achieved by fusion of the main camera and the wide-angle camera, or other fusion shooting functions. In some embodiments, the camera assembly 706 may also include a flashlight. The flashlight may be a mono-color-temperature flashlight or a two-color-temperature flashlight. The two-color-temperature flashlight is a combination of a warm flashlight and a cold flashlight and can be used for light compensation at different color temperatures.

The audio circuit 707 may include a microphone and a speaker. The microphone is configured to acquire sound waves of users and environments, and convert the sound waves into electrical signals which are input into the processor 701 for processing or input into the radio frequency circuit 704 for voice communication. For the purpose of stereo acquisition or noise reduction, there may be a plurality of microphones respectively disposed at different positions of the terminal 700. The microphone may also be an array microphone or an omnidirectional acquisition microphone. The speaker is then configured to convert the electrical signals from the processor 701 or the RF circuit 704 into the sound waves. The speaker may be a conventional film speaker or a piezoelectric ceramic speaker. When the speaker is the piezoelectric ceramic speaker, the electrical signal can be converted into not only human-audible sound waves but also the sound waves which are inaudible to humans for the purpose of ranging and the like. In some embodiments, the audio circuit 707 may also include a headphone jack.

The positioning assembly 708 is configured to locate the current geographic location of the terminal 700 to implement navigation or a location-based service (LBS). The positioning assembly 708 may be a positioning assembly based on the American global positioning system (GPS), the Chinese Beidou system, the Russian GRONASS system, or the Galileo system of the European Union.

A vibration motor 717 is configured to control the terminal to vibrate and can realize different vibration modes by using different vibration amplitudes and different vibration frequencies.

The power source 709 is configured to power up various components in the terminal 700. The power source 709 may be alternating current, direct current, a disposable battery, or a rechargeable battery. When the power source 709 includes the rechargeable battery, the rechargeable battery may be a wired rechargeable battery or a wireless rechargeable battery. The rechargeable battery may also support the fast charging technology.

In some embodiments, the terminal 700 also includes one or more sensors 710. The one or more sensors 710 include, but not limited to, an acceleration sensor 711, a gyro sensor 712, a pressure sensor 713, a fingerprint sensor 714, an optical sensor 715, and a proximity sensor 716.

The acceleration sensor 711 may detect magnitudes of accelerations on three coordinate axes of a coordinate system established by the terminal 700. For example, the acceleration sensor 711 may be configured to detect components of a gravitational acceleration on the three coordinate axes. The processor 701 may control the touch display screen 705 to display a user interface in a landscape view or a portrait view according to a gravity acceleration signal acquired by the acceleration sensor 711. The acceleration sensor 711 may also be configured to acquire motion data of a game or a user.

The gyro sensor 712 can detect a body direction and a rotation angle of the terminal 700, and can cooperate with the acceleration sensor 711 to acquire a 3D motion of the user on the terminal 700. Based on the data acquired by the gyro sensor 712, the processor 701 can implement the following functions: motion sensing (such as changing the UI according to a user's tilt operation), image stabilization during shooting, game control, and inertial navigation.

The pressure sensor 713 may be disposed on a side frame of the terminal 700 and/or a lower layer of the touch display screen 705. When the pressure sensor 713 is disposed on the side frame of the terminal 700, a user's holding signal to the terminal 700 can be detected. The processor 701 can perform left-right hand recognition or quick operation according to the holding signal acquired by the pressure sensor 713. When the pressure sensor 713 is disposed on the lower layer of the touch display screen 705, the processor 701 controls an operable control on the UI according to a user's pressure operation on the touch display screen 705. The operable control includes at least one of a button control, a scroll bar control, an icon control, and a menu control.

The fingerprint sensor 714 is configured to acquire a user's fingerprint. The processor 701 identifies the user's identity based on the fingerprint acquired by the fingerprint sensor 714, or the fingerprint sensor 714 identifies the user's identity based on the acquired fingerprint. When the user's identity is identified as trusted, the processor 701 authorizes the user to perform related sensitive operations, such as unlocking the screen, viewing encrypted information, downloading software, paying, and changing settings. The fingerprint sensor 714 may be disposed on the front, the back, or one side of the terminal 700. When the terminal 700 is provided with a physical button or a manufacturer's Logo, the fingerprint sensor 714 may be integrated with the physical button or the manufacturer's Logo.

The optical sensor 715 is configured to acquire ambient light intensity. In one embodiment, the processor 701 may control the display brightness of the touch display screen 705 according to the ambient light intensity acquired by the optical sensor 715. Specifically, when the ambient light intensity is high, the display brightness of the touch display screen 705 is increased; and when the ambient light intensity is low, the display brightness of the touch display screen 705 is decreased. In another embodiment, the processor 701 may also dynamically adjust shooting parameters of the camera assembly 706 according to the ambient light intensity acquired by the optical sensor 715.

The proximity sensor 716, also referred to as a distance sensor, is usually disposed on the front panel of the terminal 700. The proximity sensor 716 is configured to capture a distance between the user and the front of the terminal 700. In one embodiment, when the proximity sensor 716 detects that the distance between the user and the front of the terminal 700 gradually decreases, the processor 701 controls the touch display screen 705 to switch from a screen-on state to a screen-off state. When the proximity sensor 716 detects that the distance between the user and the front of the terminal 700 gradually increases, the processor 701 controls the touch display screen 705 to switch from the screen-off state to the screen-on state.

Those skilled in the art may understand that the structure shown in FIG. 7 does not constitute a limitation to the terminal 700. The terminal 700 may include more or fewer assemblies than those shown in the figure, or a combination of some assemblies, or an arrangement of different assemblies.

Figure 8:
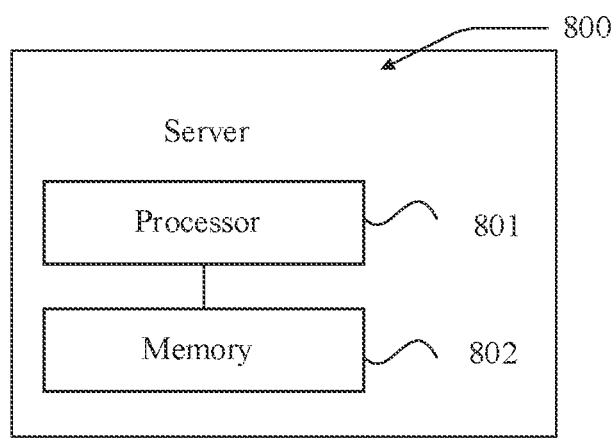
FIG. 8 is a schematic structural diagram of a server according to an embodiment of the present disclosure.

FIG. 8 is a schematic structural diagram of a server according to an embodiment of the present disclosure. Significant differences may be generated when the server 800 has different configurations or performances. The server 800 may include one or more processors (CPU) 801 and one or more memories 802 storing at least one instruction. The at least one instruction, when loaded and executed by the one or more processors 801, cause the one or more processors 801 to perform the method for playing audios according to the foregoing method embodiments. In addition, the server may also have components such as a wired or wireless network interface, a keyboard, and an input/output interface, for input and output. The server may further include other components for implementing the functions of the device, which will not be described herein.

In some embodiments, there is also provided a computer-readable storage medium, such as a memory including instructions. The instructions can be executed by the processor in the terminal to perform the method for playing audios according to the above embodiments. The computer-readable storage medium may be non-transitory. For example, the computer-readable storage medium may be a read-only memory (ROM), a random access memory (RAM), a compact disk ROM (CD-ROM), a magnetic tape, a floppy disk, an optical data storage device, or the like.

Those of ordinary skill in the art can understand that all or some of the steps of implementing the foregoing embodiments can be completed by hardware, or can be completed by instructing relevant hardware by a program. The program can be stored in a computer-readable storage medium. The above-mentioned storage medium may be a read-only memory, a magnetic disk, a compact disc, or the like.

The foregoing descriptions are merely preferred embodiments of the present disclosure and are not intended to limit the present disclosure. Any modification, equivalent replacement, and improvement within the spirit and principle of the present disclosure shall be included within the protection scope of the present disclosure.

What is claimed is:

1. A method for playing audios, applicable to a terminal, comprising:
   receiving an instruction for playing a target audio;
   acquiring a vibration file corresponding to the target audio and configured to control a vibration motor of the terminal, wherein the vibration file comprises a vibration intensity and a vibration frequency;
   acquiring and decoding the target audio, and synchronously playing decoded data of the target audio and the vibration file; and
   controlling the vibration motor of the terminal to vibrate based on the vibration intensity and the vibration frequency in the vibration file.

2. The method according to claim 1, wherein the vibration file further comprises vibration intensity variation information and vibration frequency variation information, wherein the vibration intensity variation information indicates variations of the vibration intensity with time in a corresponding vibration period, and the vibration frequency variation information indicates variations of the vibration frequency with time in a corresponding vibration period.

3. The method according to claim 1, wherein said acquiring the vibration file corresponding to the target audio and configured to control the vibration motor comprises:
   in the case that the vibration file corresponding to the target audio is stored in the terminal, acquiring the vibration file stored in the terminal; or
   in the case that the vibration file corresponding to the target audio is not stored in the terminal, sending a request for acquiring the vibration file to a server to acquire the vibration file corresponding to the target audio, the request carrying an identifier of the target audio; or processing the target audio to acquire the vibration file corresponding to the target audio.

4. The method according to claim 3, wherein said processing the target audio to acquire the vibration file corresponding to the target audio comprises:
   acquiring an audio of at least one target percussive instrument by performing sound source separation on the target audio;
   determining at least one beat period from the audio of the at least one target percussive instrument, and determining an instrument type of a target percussive instrument corresponding to the at least one beat period; and
   determining at least one vibration period based on the at least one beat period, determining vibration attribute information corresponding to the at least one vibration period based on the instrument type corresponding to the at least one beat period, and generating the vibration file.

5. The method according to claim 4, wherein said determining the at least one vibration period based on the at least one beat period comprises:
   in the case that a proportion of a total duration of the at least one beat period to an entire duration of the target audio is within a predetermined proportion range, determining the at least one vibration period based on the at least one beat period.

6. The method according to claim 4, wherein determining the at least one vibration period based on the at least one beat period comprises:
   in the case that a number of the at least one beat period is within a predetermined number range, determining the at least one vibration period based on the at least one beat period.

7. The method according to claim 3, wherein said processing the target audio to acquire the vibration file corresponding to the target audio comprises:
   acquiring an audio of at least one target percussive instrument by performing sound source separation on the target audio;
   determining at least one beat period from the audio of the at least one target percussive instrument, and determining an audio amplitude corresponding to the at least one beat period; and
   determining at least one vibration period based on the at least one beat period, determining vibration attribute information corresponding to the at least one vibration period based on the audio amplitude corresponding to the at least one beat period, and generating the vibration file.

8. The method according to claim 7, wherein said determining the audio amplitude corresponding to the at least one beat period comprises:
   determining a maximum audio amplitude among audio amplitudes at all time points of each beat period of the at least one beat period as an audio amplitude corresponding to the beat period.

9. The method according to claim 7, wherein determining the at least one vibration period based on the at least one beat period comprises:
   in the case that a proportion of a total duration of the at least one beat period to an entire duration of the target audio is within a predetermined proportion range, determining the at least one vibration period based on the at least one beat period.

10. The method according to claim 7, wherein determining the at least one vibration period based on the at least one beat period comprises:
    in the case that a number of the at least one beat period is within a predetermined number range, determining the at least one vibration period based on the at least one beat period.

11. The method according to claim 1, wherein synchronously playing the decoded data of the target audio and the vibration file comprises:
    in the case that a predetermined duration elapses upon receipt of the instruction for playing the target audio, synchronously playing the decoded data of the target audio and the vibration file.

12. A method for playing audios, applicable to a server, comprising:
    receiving, from a terminal, a request for acquiring a target audio; and
    sending the target audio, and a vibration file corresponding to the target audio and configured to control a vibration motor of the terminal to the terminal, such that the terminal decodes the target audio, plays decoded data of the target audio and the vibration file synchronously, and controls the vibration motor of the terminal to vibrate based on a vibration intensity and a vibration frequency in the vibration file.

13. The method according to claim 12, further comprising:
- acquiring an audio of at least one target percussive instrument by performing sound source separation on the target audio;
- determining at least one beat period from the audio of the at least one target percussive instrument, and determining an instrument type of a target percussive instrument corresponding to the at least one beat period; and
- determining at least one vibration period based on the at least one beat period, determining vibration attribute information corresponding to the at least one vibration period based on the instrument type corresponding to the at least one beat period, and generating the vibration file.

14. The method according to claim 13, wherein determining the at least one vibration period based on the at least one beat period comprises:
- in the case that a proportion of a total duration of the at least one beat period to an entire duration of the target audio is within a predetermined proportion range, determining the at least one vibration period based on the at least one beat period.

15. The method according to claim 13, wherein determining the at least one vibration period based on the at least one beat period comprises:
- in the case that a number of the at least one beat period is within a predetermined number range, determining the at least one vibration period based on the at least one beat period.

16. The method according to claim 12, further comprising:
- acquiring an audio of at least one target percussive instrument by performing sound source separation on the target audio;
- determining at least one beat period from the audio of the at least one target percussive instrument, and determining an audio amplitude corresponding to the at least one beat period; and
- determining at least one vibration period based on the at least one beat period, determining vibration attribute information corresponding to the at least one vibration period based on the audio amplitude corresponding to the at least one beat period, and generating the vibration file.

17. The method according to claim 16, wherein determining the audio amplitude corresponding to the at least one beat period comprises:
- determining a maximum audio amplitude among audio amplitudes at all time points of each beat period of the at least one beat period as an audio amplitude corresponding to the beat period.

18. The method according to claim 17, wherein determining the at least one vibration period based on the at least one beat period comprises:
- in the case that a proportion of a total duration of the at least one beat period to an entire duration of the target audio is within a predetermined proportion range, determining the at least one vibration period based on the at least one beat period.

19. The method according to claim 17, wherein determining the at least one vibration period based on the at least one beat period comprises:
- in the case that a number of the at least one beat period is within a predetermined number range, determining the at least one vibration period based on the at least one beat period.

20. A system for playing audios, comprising a terminal and a server; wherein
the terminal is configured to:
- receive an instruction for playing a target audio;
- acquire a vibration file corresponding to the target audio and configured to control a vibration motor of the terminal, wherein the vibration file comprises a vibration intensity and a vibration frequency;
- acquire and decode the target audio, and synchronously play decoded data of the target audio and the vibration file; and
- control the vibration motor of the terminal to vibrate based on the vibration intensity and the vibration frequency in the vibration file; and the server is configured to receive, from the terminal, a request for acquiring the target audio, and send the target audio and the vibration file corresponding to the target audio and configured to control the vibration motor to the terminal.

* * * * *